(12) United States Patent
Ohbitsu

(10) Patent No.: US 8,732,849 B2
(45) Date of Patent: May 20, 2014

(54) CONTENT SERVER DEVICE AND CONTENT DELIVERY METHOD

(75) Inventor: Toshiro Ohbitsu, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 13/214,466

(22) Filed: Aug. 22, 2011

(65) Prior Publication Data

US 2011/0307962 A1 Dec. 15, 2011

Related U.S. Application Data

(63) Continuation of application No. PCT/JP2009/053697, filed on Feb. 27, 2009.

(51) Int. Cl.
G06F 21/00 (2013.01)

(52) U.S. Cl.
USPC .............. 726/27; 726/31; 705/52; 705/59

(58) Field of Classification Search
None
See application file for complete search history.

(56) References Cited

U.S. PATENT DOCUMENTS

| | | | | |
|---|---|---|---|---|
| 6,453,349 | B1 * | 9/2002 | Kano et al. | 709/226 |
| 7,761,568 | B1 * | 7/2010 | Levi et al. | 709/225 |
| 2002/0161884 | A1 * | 10/2002 | Munger et al. | 709/224 |
| 2003/0188000 | A1 * | 10/2003 | Kojima | 709/229 |
| 2004/0103011 | A1 | 5/2004 | Hatano et al. | |
| 2004/0107344 | A1 * | 6/2004 | Minemura et al. | 713/171 |
| 2004/0151315 | A1 * | 8/2004 | Kim | 380/241 |
| 2005/0154908 | A1 * | 7/2005 | Okamoto | 713/193 |
| 2006/0059103 | A1 * | 3/2006 | Ebihara et al. | 705/59 |
| 2007/0136817 | A1 * | 6/2007 | Nguyen | 726/26 |

FOREIGN PATENT DOCUMENTS

| | | |
|---|---|---|
| CN | 101355569 | 1/2009 |
| CN | 101355569 A * | 1/2009 |
| EP | 1049087 A2 | 11/2000 |
| JP | 2001-14221 | 1/2001 |
| JP | 2001-22859 | 1/2001 |
| JP | 2002-247021 | 8/2002 |
| JP | 2004-13564 | 1/2004 |
| JP | 2006-85484 | 3/2006 |
| JP | 2006-186871 | 7/2006 |
| WO | 02/097694 A1 | 12/2002 |

OTHER PUBLICATIONS

International Preliminary Report on Patentability, mailed Sep. 22, 2011, in International Application No. PCT/JP2009/053697 (6 pp.).
International Search Report for PCT/JP2009/053697, mailed Mar. 24, 2009.
Chinese Office Action issued Aug. 12, 2013 for corresponding Chinese Application No. 200980157563.9.

* cited by examiner

*Primary Examiner* — Gilberto Barron, Jr.
*Assistant Examiner* — Malcolm Cribbs
(74) *Attorney, Agent, or Firm* — Staas & Halsey LLP

(57) ABSTRACT

A content server device includes a request section for requesting a key server to transmit key data for decrypting encrypted content data to a client side in response to the content distribution request from the client side and a control unit which prohibits the transmission of the encrypted content data in response to the content distribution request when the reception number of notification received from the client side and indicating the reception of the key data from the key server is not less than the transmission number of key data to the client side by the key server and which transmits the encrypted content data in response to the content distribution request when the number of reception is not more than the number of transmission.

3 Claims, 13 Drawing Sheets

FIG. 3

| MOVING PICTURE DATA ID : xyz | | |
|---|---|---|
| DATE/TIME | CLIENT | KEY DATA |
| 2009.2.10 12:34 | abc123 | 111 |
| 2009.2.10 13:10 | def456 | 111 |
| ... | ... | ... |

T200

US 8,732,849 B2

CONTENT SERVER DEVICE AND CONTENT DELIVERY METHOD

CROSS-REFERENCE TO RELATED APPLICATIONS

This is a continuation of Application, filed under 35 U.S.C. §111(a) of International Application PCT/JP2009/053697, filed on Feb. 27, 2009, the contents of which are herein wholly incorporated by reference.

FIELD

The present invention relates to a content server device which transmits content data, a content delivery method and a content delivery program.

BACKGROUND

Over the recent years, a stream delivery (streaming) of a moving picture etc down to a personal computer (which will hereinafter be abbreviated to PC) defined as a client device from a server on the Internet, has widely spread. A DRM (Digital Right Management) technology is given as a technology for encrypting the moving picture data on the occasion of the stream delivery of the moving picture down to the PC from the server. The stream delivery based on the DRM technology involves using, e.g., encrypted moving picture data and information (which will hereinafter be referred to as key data) for decrypting this encrypted moving picture data.
[Patent document 1] Japanese Patent Laid-Open Publication No. 2004-13564

SUMMARY

In the stream delivery of the moving picture data, for example, a server (which will hereinafter be also termed a moving picture server) for delivering the encrypted moving picture data receives a notification purporting that the key data is received from the PC which has received the key data from a server (which will hereinafter be a keyserver) for delivering the key data, and transmits the encrypted moving picture data to the PC. Herein, if the PC acquires the key data without via the keyserver in an unauthorized manner, this PC may not receive the key data from the keyserver. This PC notifies the moving picture server of the purport that the key data is received, and receives the encrypted moving picture data from the moving picture server. The PC decrypts the encrypted moving picture data by use of the key data acquired in the unauthorized manner, thus reproducing the moving picture. In this case, the moving picture server can not recognize that the key data is acquired in the unauthorized manner and is therefore disabled from stopping the delivery. Hence, the PC can, without acquiring the key data from the keyserver, decrypt the moving picture data by employing the key data acquired in the unauthorized manner and can thus reproduce the moving picture.

Moreover, the phenomenon described above might occur even when delivering content data of voices (sounds) etc without being limited to the moving picture data.

According to one mode of the present invention, it is an object to prevent the content data from being acquired in the unauthorized manner.

According to one mode of the present invention, a content server device includes: a request unit to request a keyserver to transmit key data for decrypting encrypted content data to a client side in response to a content delivery request given from the client side; and a control unit to inhibit, when a reception count of a notification received from the client side and indicating that the key data is received from the keyserver is larger than a transmission count of the key data to the client side from the keyserver, the transmission of the encrypted content data in response to the content delivery request, and to transmit, when the reception count is equal to or smaller than the transmission count, the encrypted content data in response to the content delivery request.

According to one mode of the present invention, it is feasible to prevent the content data from being acquired in the unauthorized manner.

BRIEF DESCRIPTION OF THE DRAWINGS

FIG. 3 is a diagram illustrating an example of a key data delivery table.

Figure 1:
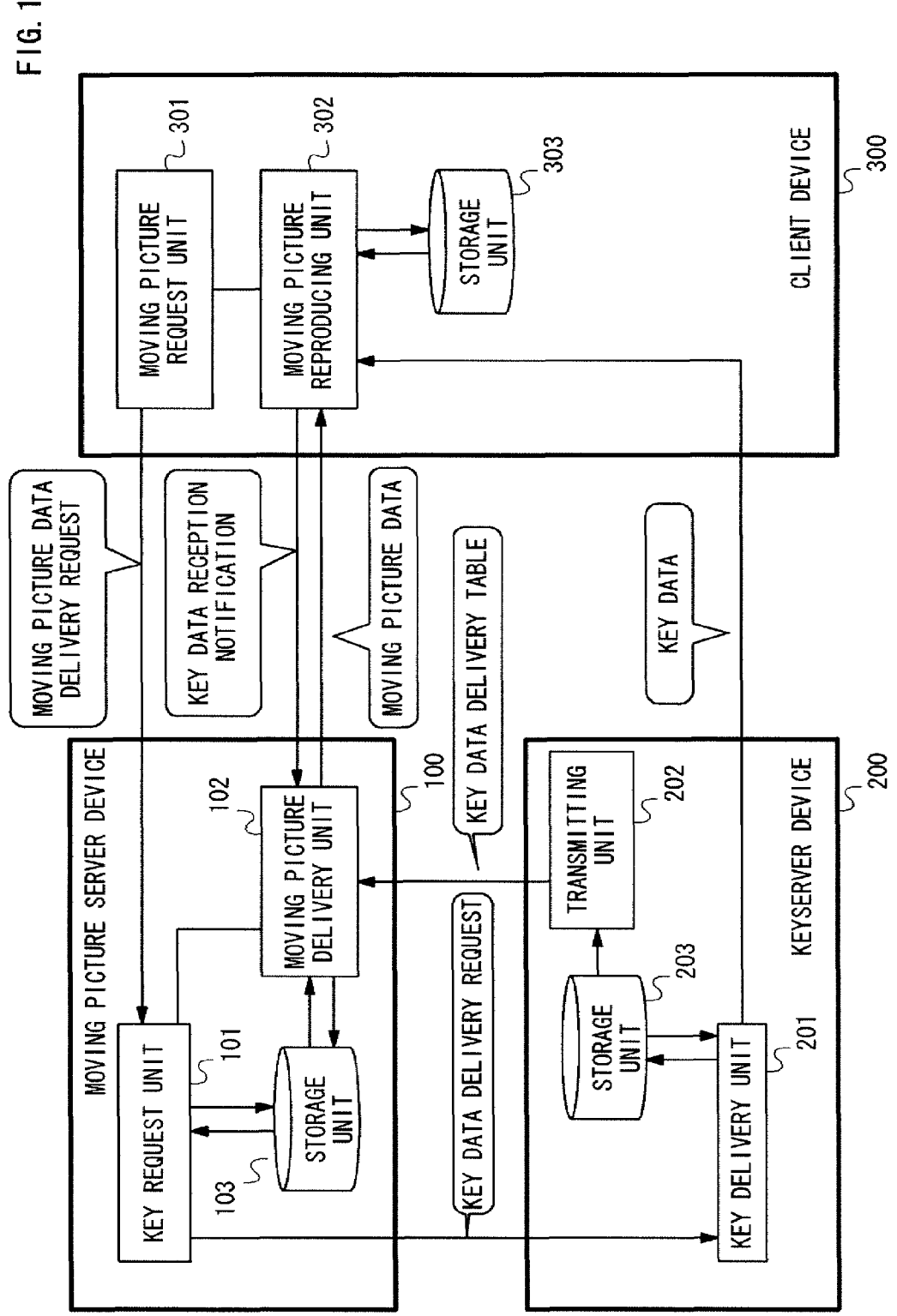
FIG. 1 is a diagram illustrating an example of an architecture of a moving picture data delivery system in a first embodiment.

REFERENCE SIGNS LIST 100 moving picture server device
101 key request unit
102 moving picture delivery unit
103 storage unit
200 keyserver device
201 key delivery unit
202 transmitting unit
203 storage unit
300 client device
301 moving picture request unit
302 moving picture reproducing unit
303 storage unit

DESCRIPTION OF EMBODIMENTS

Embodiment of the present invention will hereinafter be described with reference to the drawings. Configurations in the following embodiments are exemplifications, and the present invention is not limited to the configurations in the embodiments.

Herein, a moving picture data delivery system for delivering image data of moving pictures will be described, however, the moving picture data delivery system according to the embodiment can be applied to a content delivery system including a content server device which delivers other categories of content data of the moving picture such an image data, voice (sound) data and text data.

First Embodiment (Example of System Architecture)

FIG. 1 is a diagram illustrating an example of an architecture of the moving picture delivery system. A moving picture delivery system 10 in a first embodiment includes a moving picture server device 100, a keyserver device 200 and a client device 300. In the example of FIG. 1, one single client device 300 is disclosed, however, a plurality of client devices 300 may also exist.

The moving picture server device 100 delivers moving picture data to the client device 300. The moving picture server device 100 includes a key request unit 101, a moving picture delivery unit 102 and a storage unit 103.

The key request unit 101, upon receiving a moving picture data delivery request from the client device 300, instructs the keyserver device 200 to transmit a piece of key data to the client device 300. The key data is defined as data that is necessary for the client device 300 to decrypt the encrypted moving picture data.

The moving picture delivery unit 102 receives a notification (which will hereinafter be also termed a key data reception notification) indicating that the key data is received from the client device 300. The moving picture delivery unit 102 stores the received key data reception notification in the storage unit 103. The moving picture delivery unit 102 receives a key data delivery table T200 (FIG. 3) from the keyserver device 200. The moving picture delivery unit 102, if a key data reception notification count of these notifications stored in the storage unit 103 and a key data count of the key data transmitted to the client devices 300 from the keyserver device 200 satisfy a predetermined condition, delivers the moving picture data to the client devices 300 to which the key data reception notifications are transmitted. This type of moving picture is an encrypted moving picture that can be decrypted by use of the key data transmitted to the client device 300.

The storage unit 103 of the moving picture server device 100 is stored with the key data reception notification received from the client device 300 and the key data delivery table T200 received from the keyserver device 200. Further, the storage unit 103 can be also stored with the encrypted moving picture.

The keyserver device 200 transmits the key data to the client device 300. The keyserver device 200 includes a key delivery unit 201, a transmitting unit 202 and a storage unit 203.

The key delivery unit 201, when requested to transmit the key data to the client device 300 from the moving picture server device 100, transmits the key data to the client device 300. The key delivery unit 201, in the key data delivery table T200, records an event that the key delivery unit 201 transmits the key data to the client device 300, and stores this event in the storage unit 203.

The transmitting unit 202 transmits the key data delivery table T200 stored in the storage unit 203 to the moving picture server device 100.

The storage unit 203 is stored with the key data delivery table T200. The key data delivery table T200 is prepared on a per moving-picture-data basis. Further, the storage unit 203 can be also stored with the key data that is transmitted to the client device 300. The key data is prepared for every set of moving picture data stored in the moving picture server device 100. The key data is utilized for decrypting the encrypted moving picture data stored in the moving picture server device 100. The key data stored in the storage unit 203 of the keyserver device 200 and the moving picture data stored in the storage unit 103 of the moving picture server device 100, are associated on a one-to-one basis.

The client device 300 requests the moving picture server device 100 to deliver the moving picture data and decrypts the moving picture data transmitted from the moving picture server device 100, thus reproducing the moving picture data. The client device 300 receives the key data from the keyserver device 200. The client device 300 includes a moving picture request unit 301, a moving picture reproducing unit 302 and a storage unit 303.

The moving picture request unit 301 requests the moving picture server device 100 to deliver the moving picture data.

The moving picture reproducing unit 302 receives the key data associated with the requested moving picture data. The moving picture reproducing unit 302 notifies the moving picture server device 100 that the key data is received. The moving picture reproducing unit 302 receives the encrypted moving picture data from the moving picture server device 100. The moving picture reproducing unit 302 decrypts the encrypted moving picture data by use of the key data. The moving picture reproducing unit 302 reproduces the decrypted moving picture data. The moving picture reproducing unit 302 can store the received key data and the received moving picture data in the storage unit 303.

The storage unit 303 can be stored with the key data received from the keyserver device 200 and the moving picture data received from the moving picture server device 100.

The moving picture server device 100 and the keyserver device 200 can be realized by employing a general-purpose computer such as a personal computer or a dedicated computer such as a server machine.

The client device 300 can be realized by using the dedicated or general-purpose computer such as the personal computer (PC), a workstation (WS), a PDA (Personal Digital Assistant), a smartphone, a mobile phone and a car navigation device or using an electronic device mounted with the computer.

The computer, i.e., an information processing device includes a processor, main and secondary storage devices each serving as a readable-by-computer recording medium and an interface device with a peripheral device such as the secondary storage device and the interface device.

The computer is, the processor loading a program stored in the secondary storage device into the main storage device and executing this program, thereby enabled to realize a function matching with a predetermined purpose.

The processor is exemplified such as a CPU (Central Processing Unit) and a DSP (Data Signal Processor). The main storage device is exemplified such as a RAM (Random Access Memory) and a ROM (Read Only Memory). The secondary storage device is exemplified by a hard disk drive (HDD) etc. Further, the secondary storage device can include a removable medium, i.e., a portable recording medium. The removable medium is a USB (Universal Serial Bus) memory or a disc recording medium such as a CD (Compact Disk) and a DVD (Digital Versatile Disk).

A communication interface device is exemplified such as a LAN (Local Area Network) interface board and a wireless communication circuit for wireless communications. The peripheral device can include, in addition to the secondary storage device and the communication interface device, an input device such as a keyboard and a pointing device and an output device such as a display device and a printer. Further, the peripheral device can also include input/output devices such as a camera, a microphone and a loudspeaker for inputting and outputting videos, images and voices (sounds).

The program stored in the secondary storage device is loaded into the main storage device and then executed by the processor, whereby the computer utilized as the moving picture server device 100 realizes functions as the key request unit (module) 101 and the moving picture delivery unit (module) 102. On the other hand, the storage unit 103 is provided in a storage area of the main storage device or the secondary storage device.

The program stored in the secondary storage device is loaded into the main storage device and then executed by the processor, whereby the computer utilized as the keyserver device 200 realizes functions as the key delivery unit (module) 201 and the transmitting unit (module) 202. On the other hand, the storage unit 203 is provided in the storage area of the main storage device or the secondary storage device.

The program stored in the secondary storage device is loaded into the main storage device and then executed by the processor, whereby the computer utilized as the client device 300 realizes functions as the moving picture request unit (module) 301 and the moving picture reproducing unit (module) 302. On the other hand, the storage unit 303 is provided in the storage area of the main storage device or the secondary storage device.

(Operational Example)

Figure 2:
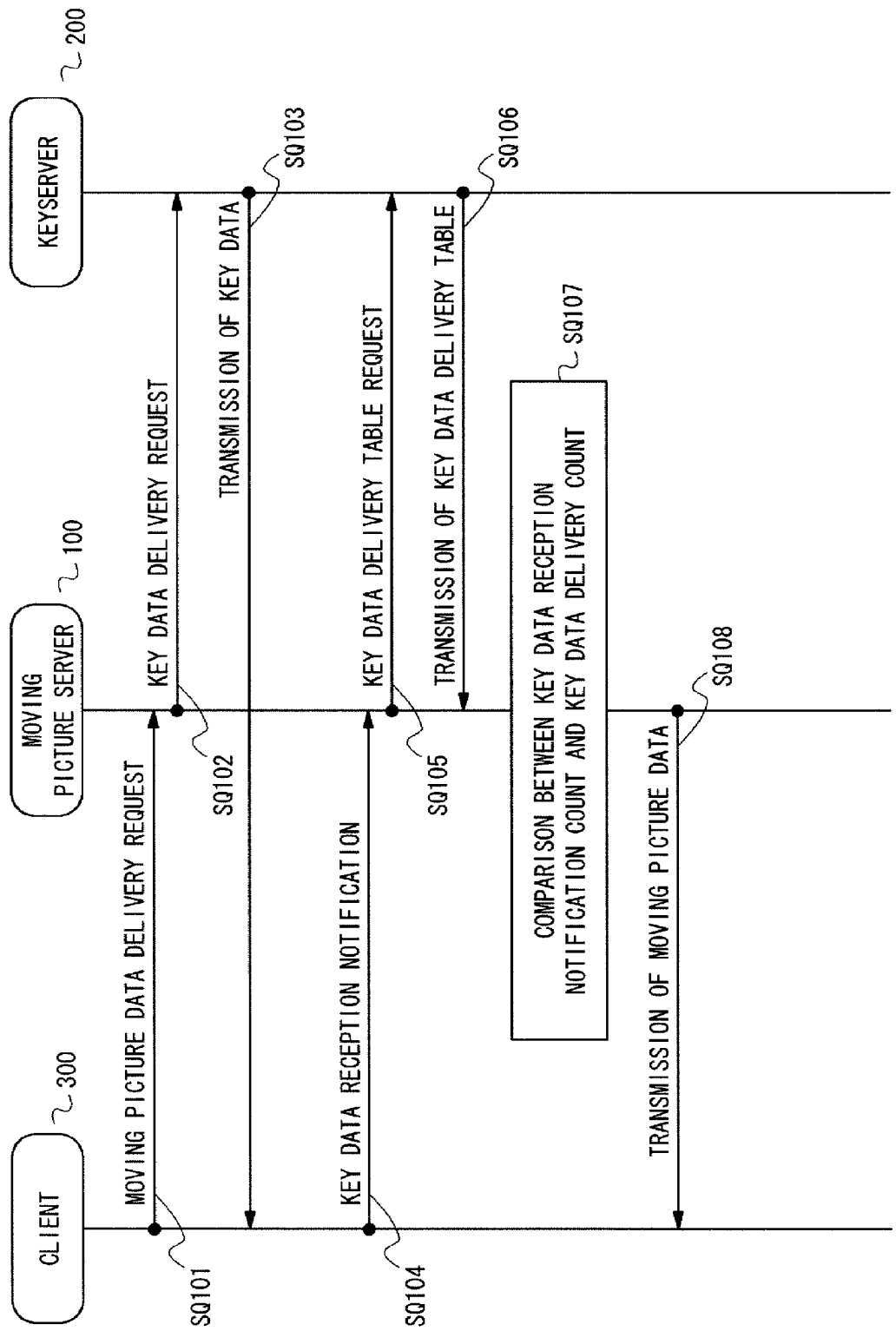
FIG. 2 is a diagram illustrating an example of an operation sequence till a client device receives delivery of moving picture data since the client device has made a moving picture data delivery request.

FIG. 2 is a diagram illustrating an example of an operation sequence till the client device receives the delivery of the moving picture data since the client device has made the moving picture data delivery request.

The moving picture request unit 301 of the client device 300 presents a list of the moving picture data to the user. The moving picture request unit 301 of the client device 300 previously obtains, from the moving picture server device 100, the list of the moving picture data that can be delivered by the moving picture server device 100.

The moving picture request unit 301 of the client device 300, as triggered by an event that the user selects the moving picture data, transmits a moving picture data delivery request for delivering the selected moving picture data (which is to be termed moving picture data A) to the moving picture server device 100 (SQ101). The moving picture data delivery request contains identifying information of the client device 300 defined as the requester and identifying information of the moving picture data A requested for the delivery.

The key request unit 101 of the moving picture server device 100 receives the moving picture data delivery request from the client device 300. The key request unit 101 transmits, to the keyserver device 200, a key delivery request for instructing the keyserver device 200 to transmit the key data associated with the moving picture data A to the client device 300 (SQ102). The key data delivery request contains identifying information of the client device 300 defined as the requester for the moving picture data A and identifying information of the moving picture data A. The key data associated with the moving picture data A is the key data enabling the decryption of the encrypted moving picture data A.

The key delivery unit 201 of the keyserver device 200 receives the key data delivery request from the moving picture server device 100. The key delivery unit 201 extracts, based on the identifying information of the moving picture data A that is contained in the received key data delivery request, the key data associated with the moving picture data A from the storage unit 203. The storage unit 203 gets stored with a unique piece of key data on the per moving-picture-data basis. The key delivery unit 201 transmits the thus-extracted key data to the client device 300 (of which the identifying information is) contained in the key data delivery request (SQ103). Herein, the key delivery unit 201, if the predetermined condition is satisfied, may transmit the key data to the client device 300. The predetermined condition is exemplified by a condition that the user of the client device 300 is an authorized user of the moving picture server device 100, a condition that the user of the client device 300 is a user who has already paid a fee for delivering the moving picture data, and so on.

The key delivery unit 201 records, in the key data delivery table T200, an event that the key delivery unit 201 transmits the key data to the client device 300, and stores this event in the storage unit 203.

FIG. 3 is a diagram illustrating an example of the key data delivery table. The key data delivery record table T200 includes a date and time when transmitting the key data, the identifying information of the client device 300 defined as a destination to which the key data is transmitted and the identifying information of the key data. The key data delivery record table T200 is prepared on the per moving-picture-data basis.

The moving picture reproducing unit 302 of the client device 300 receives the key data from the keyserver device 200. The moving picture reproducing unit 302 transmits, to the moving picture server 100, a key data reception notification for notifying that the key data is received (SQ104). The key data reception notification contains the identifying information of the client device 300 and the identifying information of the moving picture data (which is herein the identifying information of the moving picture data A). The key data reception notification may further contain the identifying information of the received key data.

The moving picture delivery unit 102 of the moving picture server device 100 receives the key data reception notification from the client device 300. The moving picture delivery unit 102 stores the received key data reception notification in the storage unit 103. The moving picture delivery unit 102 transmits, to the keyserver device 200, a key data delivery table request for transmitting the key data delivery table T200 (SQ105). The key data delivery table request contains the identifying information of the moving picture data A.

The transmitting unit 202 of the keyserver device 200, upon receiving the key data delivery table request from the moving picture server device 100, extracts from the storage unit 203 the key data delivery table T200 associated with the moving picture data A (of which the identifying information is) contained in the key data delivery table request. The transmitting unit 202 transmits the extracted key data delivery table T200 to the moving picture server device 100 (SQ106).

The moving picture delivery unit 102 of the moving picture server device 100 receives the key data delivery table T200 associated with the moving picture data A from the keyserver device 200. The moving picture delivery unit 102 stores the received key data delivery table T200 in the storage unit 103. The moving picture delivery unit 102 counts the number of the key data reception notifications (which is referred to as the key data reception notification count) corresponding to the moving picture data A stored in the storage unit 103. Further, the moving picture delivery unit 102 counts how many times the key data associated with the moving picture data A is delivered (which is referred to as a key data delivery count) from the key data delivery table T200 associated with the moving picture data A. The moving picture delivery unit 102 compares the key data reception notification count with the key data delivery count (SQ107).

The key data reception notification is, after the keyserver device 200 has transmitted the key data to the client device 300, transmitted to the moving picture server device 100 from the client device 300. Hence, as far as any unauthorized action is not done, it never happens that the key data reception notification count exceeds the key data delivery count. If the key data is acquired by the client device 300 in an unauthorized manner, however, the client device 300 can, without receiving the key data from the keyserver device 200, transmit the key data reception notification to the moving picture server device 100. At this time, the key data reception notification count might exceed the key data delivery count. If the key data reception notification count is larger than the key data delivery count, it is considered that the key data is acquired in the unauthorized manner.

Accordingly, the moving picture delivery unit 102 does not, if the key data reception notification count is larger than the key data delivery count, transmit the moving picture data A to the client device 300. This is because it is presumed that the key data associated with the moving picture data A is acquired in the unauthorized manner. Furthermore, the moving picture delivery unit 102 stops delivering the moving picture data A.

Moreover, the moving picture delivery unit 102 transmits, if the key data reception notification count is equal to or smaller than the key data delivery count, the moving picture data A to the client device 300 (SQ108). The moving picture data A transmitted to the client device 300 is the encrypted moving picture data that can be decrypted with the key data transmitted beforehand to the client device 300. The moving picture delivery unit 102 can transmit the moving picture data to the client device 300 in a way that segments the moving picture data into a plurality of segmented data. The moving picture reproducing unit 302 of the client device 300, when receiving the encrypted moving picture data, decrypts the encrypted moving picture data by use of the key data transmitted from the keyserver device 200. The moving picture reproducing unit 302 reproduces the decrypted moving picture data.

The moving picture server device 100 may, though the key data delivery table request is transmitted to the keyserver device 200 (SQ105) in the operation sequence of FIG. 2, make a request for notifying of the key data delivery count instead of making the requesting for the key data delivery table T200. At this time, the transmitting unit 202 of the keyserver device 200 computes the key data delivery count related to the moving picture data A from the key data delivery table T200 associated with the moving picture data A stored in the storage unit 203. The transmitting unit 202 transmits the thus-computed key data delivery count related to the moving picture data A to the moving picture server 100. With this operation, it is feasible to reduce a quantity of the data transmitted and received between the moving picture server device 100 and the keyserver device 200.

Moreover, the moving picture server device 100 transmits the key data delivery table request to the keyserver device 200 (SQ105) in the operation sequence of FIG. 2, however, the keyserver device 200 may transmit the key data delivery table T200 to the moving picture server device 100 at an interval of predetermined time. In this case, the moving picture server device 100 may not transmit the key data delivery table request to the keyserver device 200. Further, the keyserver device 200 may transmit, as a substitute for the key data delivery table T200, the key data delivery count to the moving picture server device 100 at the interval of the predetermined time.

Figure 4:
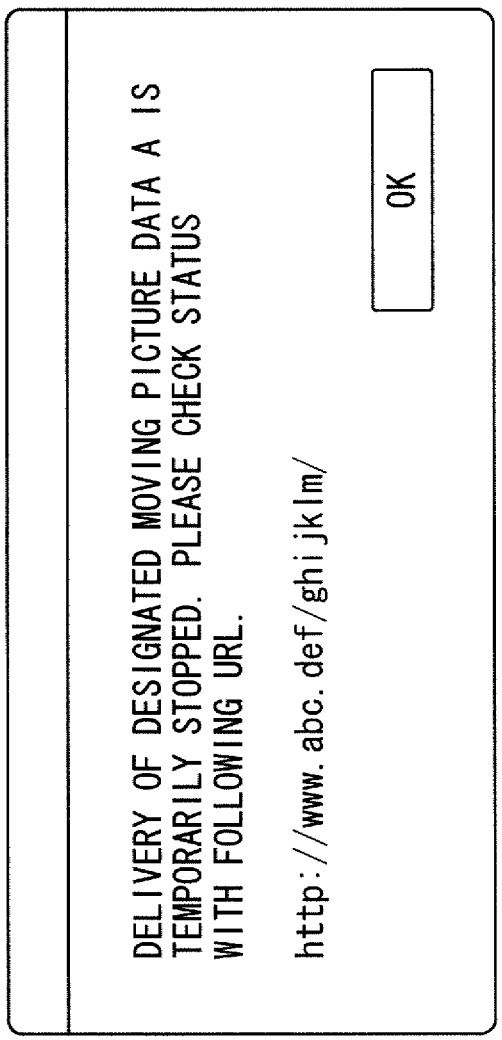
FIG. 4 is a diagram illustrating an example of displaying on the client device in the case of stopping the delivery of moving picture data A.

FIG. 4 is a diagram illustrating an example of displaying on the client device in the case of stopping the delivery of the moving picture data A.

If the key data reception notification count is larger than the key data delivery count, the moving picture delivery unit 102 can instruct the client device 300 to display a purport that the moving picture data A can not be transmitted. The client device 300 is capable of displaying, as illustrated in FIG. 4, a message "The delivery of the designated moving picture data A is temporarily stopped." in response to the instruction given from the moving picture server device 100. The user of the client device 300 can recognize from the display of this message that the delivery of the moving picture data A remains stopped.

<Operation Flow of Client Device>

Figure 5:
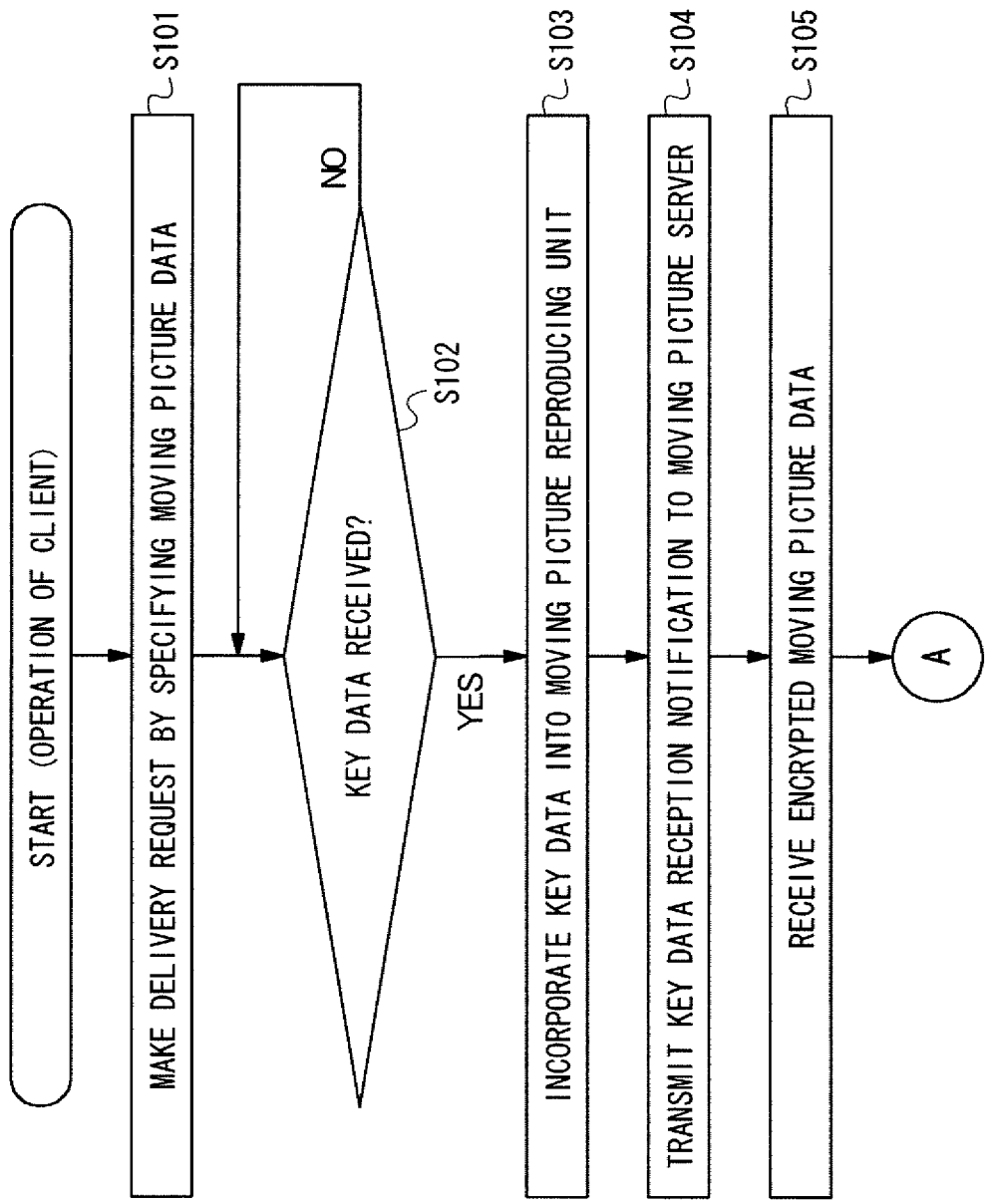
FIG. 5 is a flowchart illustrating an example of an operation flow (1) of the client device.
Figure 6:
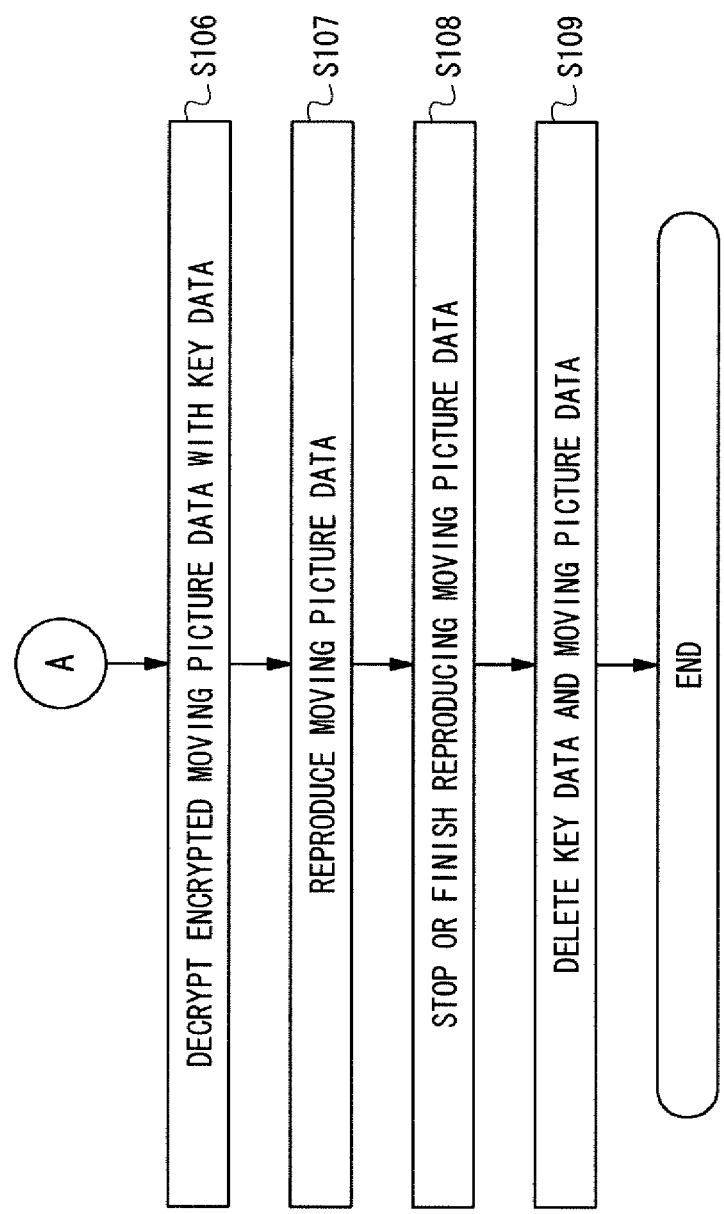
FIG. 6 is a flowchart illustrating an example of the operation flow (2) of the client device.

FIGS. 5 and 6 are flowcharts illustrating an example of the operation flow of the client device. A letter "A" in FIG. 6 is continued from "A" in FIG. 5.

The moving picture request unit 301 of the client device 300 previously acquires, from the moving picture server device 100, the list of the moving picture data that can be delivered by the moving picture server 100. The moving picture request unit 301 presents the list of the viewing-enabled moving picture data to the user and prompts the user to select the moving picture data.

The moving picture request unit 301 of the client device 300, as triggered by the event that the user selects the moving picture data, transmits the moving picture data delivery request for delivering the selected moving picture data (which is to be termed the moving picture data A) to the moving picture server device 100 (FIG. 5: S101).

The moving picture request unit 301 of the client device 300 notifies the moving picture reproducing unit 302 of the client device 300 that the request for delivering the moving picture data A has been made. The moving picture reproducing unit 302 checks whether the key data associated with the moving picture data A is received from the keyserver device 200 or not (S102). The moving picture reproducing unit 302, if the key data is not received (S102; NO), stands by till the key data is received.

The moving picture reproducing unit 302, if the key data associated with the moving picture data A is received (S102; YES), incorporates the key data into the moving picture reproducing unit 302 itself (S103). The received key data is employed by the moving picture reproducing unit 302 on the occasion of decrypting the encrypted moving picture data. The moving picture reproducing unit 302 transmits, to the moving picture server device 100, the key data reception notification saying that the key data is received (S104).

The moving picture reproducing unit 302, when receiving the encrypted moving picture data from the moving picture server device 100 (S105), decrypts this encrypted moving picture data by using the key data received from the keyserver device 200 (FIG. 6: S106).

The moving picture reproducing unit 302 reproduces the decrypted moving picture data A (S107). This operation enables the user of the client device 300 to view the moving picture data A.

The moving picture reproducing unit 302, when stopping or finishing the reproduction of the moving picture data A (S108), deletes the key data and the moving picture data A (S109), and terminates the processing. This operation can prevent the moving picture data A transmitted to the client device 300 from being reproduced again.

<Operation Flow of Moving Picture Server>

Figure 7:
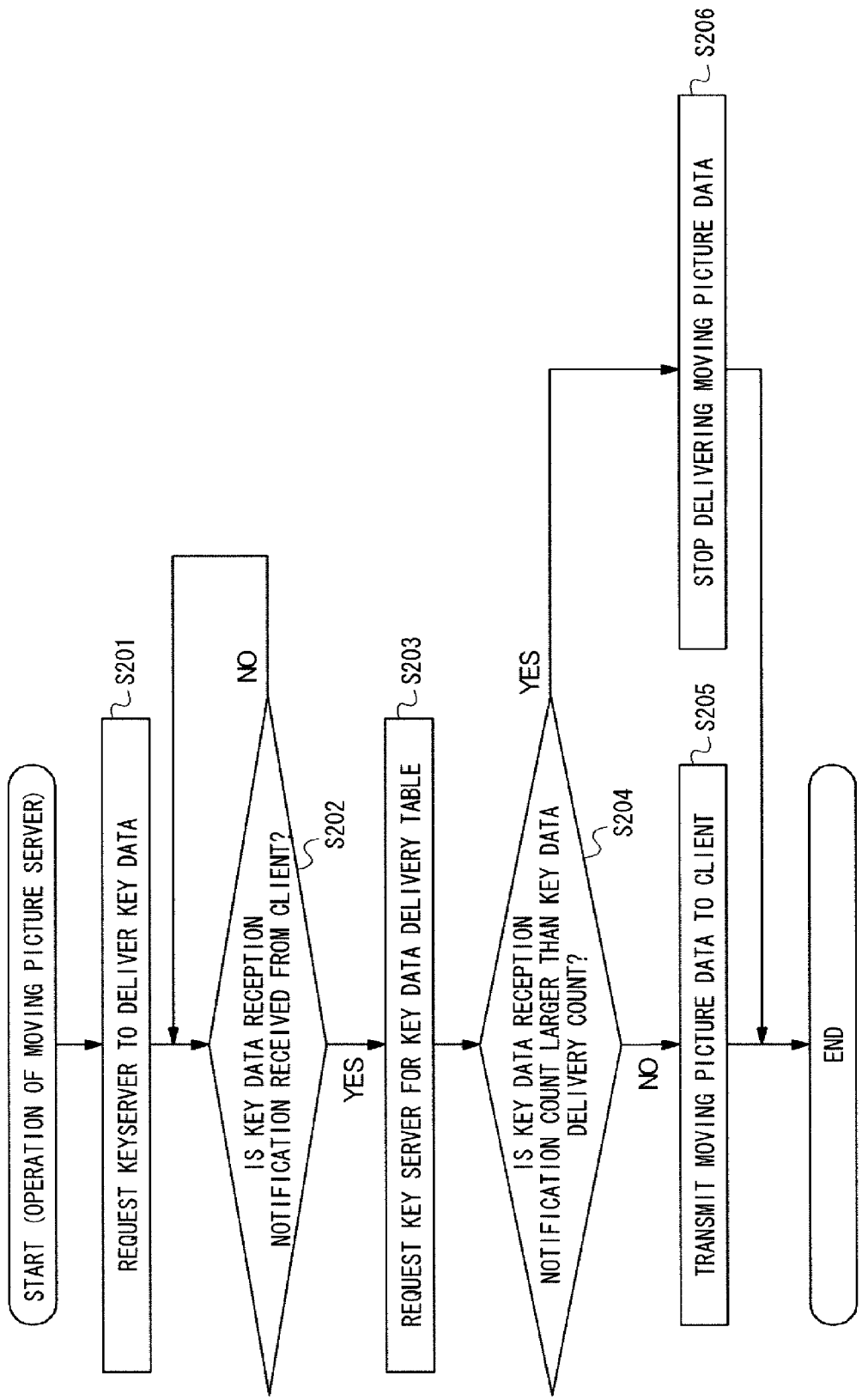
FIG. 7 is a flowchart illustrating an example of an operation flow of a moving picture server.

FIG. 7 is a flowchart illustrating an example of an operation flow of the moving picture server. A start of the operation flow in FIG. 7 is triggered by receiving the moving picture data delivery request given from the client device 300.

The key request unit 101 of the moving picture server device 100, when receiving the moving picture data delivery request from the client device 300, transmits the key data delivery request to the keyserver device 200 (S201). An assumption is herein that the moving picture server device 100 receives the request for delivering the moving picture data A. The key data delivery request is a request for giving an instruction of transmitting the key data associated with the moving picture data A requested for the delivery to the client device 300. The key request unit 101 notifies the moving picture delivery unit 102 that the key data delivery request is sent to the keyserver device 200.

The moving picture delivery unit 102 of the moving picture server device 100 checks whether the key data reception notification is received from the client device 300 or not (S202). The moving picture delivery unit 102, if the key data reception notification is not yet received (S202; NO), stands by till the key data reception notification is received.

The moving picture delivery unit 102, whereas if the key data reception notification is received (S202; YES), stores the key data reception notification in the storage unit 103. The moving picture delivery unit 102 transmits the key data delivery table request for requesting the keyserver device 200 to transmit the key data delivery table T200 associated with the moving picture data A (of which the identifying information is) contained in the key data reception notification (S203).

The moving picture delivery unit 102, upon receiving the key data delivery table T200 from the keyserver device 200, stores the key data delivery table T200 in the storage unit 103. The moving picture delivery unit 102 counts the number of the key data reception notifications (the key data reception notification count) corresponding to the moving picture data A stored in the storage unit 103. Further, the moving picture delivery unit 102 counts how many times the key data associated with the moving picture data A is transmitted (the key data delivery count) from the key data delivery table T200 stored in the storage unit 103.

The moving picture delivery unit 102 compares the key data reception notification count with the key data delivery count and, if the key data reception notification count is equal to or smaller than the key data delivery count (S204; NO), transmits the moving picture data A to the client device 300 (S205). The moving picture data A transmitted to the client device 300 is the encrypted moving picture data that can be decrypted with the key data sent beforehand to the client device 300. The encrypted moving picture data A is stored in the storage unit 103.

Moreover, the moving picture delivery unit 102, if the key data reception notification count is larger than the key data delivery count (S204; YES), does not transmit the moving picture data A to the client device 300. Further, the moving picture delivery unit 102 stops delivering the moving picture data A (S206).

<Operation Flow of Keyserver Device>

Figure 8:
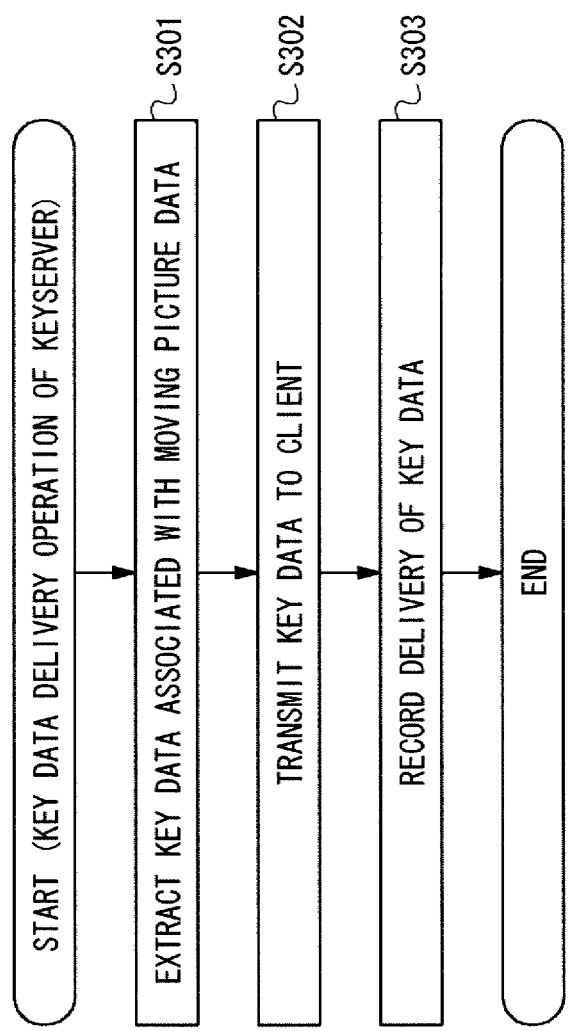
FIG. 8 is a flowchart illustrating an example of an operation flow of how a keyserver device delivers key data.

FIG. 8 is a flowchart illustrating an example of an operation flow of how the keyserver device delivers the key data. A start of the operation flow in FIG. 8 is triggered by receiving the key data delivery request from the moving picture server device 100.

The key delivery unit 201 of the keyserver device 200, when receiving the key data delivery request from the moving picture server device 100, extracts the key data associated with the moving picture data on the basis of the identifying information of the moving picture data, which is contained in the key data delivery request (S301).

The key delivery unit 201 transmits the extracted key data to the client device 300 (of which the identifying information is) contained in the key data delivery request (S302). The key delivery unit 201 may also transmit, in the case of satisfying the predetermined condition, the key data to the client device 300. The predetermined condition is exemplified by the condition that the user of the client device 300 is the authorized user of the moving picture server device 100, the condition that the user of the client device 300 is the user who has already paid the fee for delivering the moving picture data, and so on.

The key delivery unit 201 records, in the key data delivery table T200, the event that the key delivery unit 201 transmits the key data to the client device 300, and stores this event in the storage unit 203 (S303). The key data delivery record table T200 is prepared on the per moving-picture-data basis and includes the date and time when transmitting the key data, the identifying information of the client device 300 and the identifying information of the key data.

Figure 9:
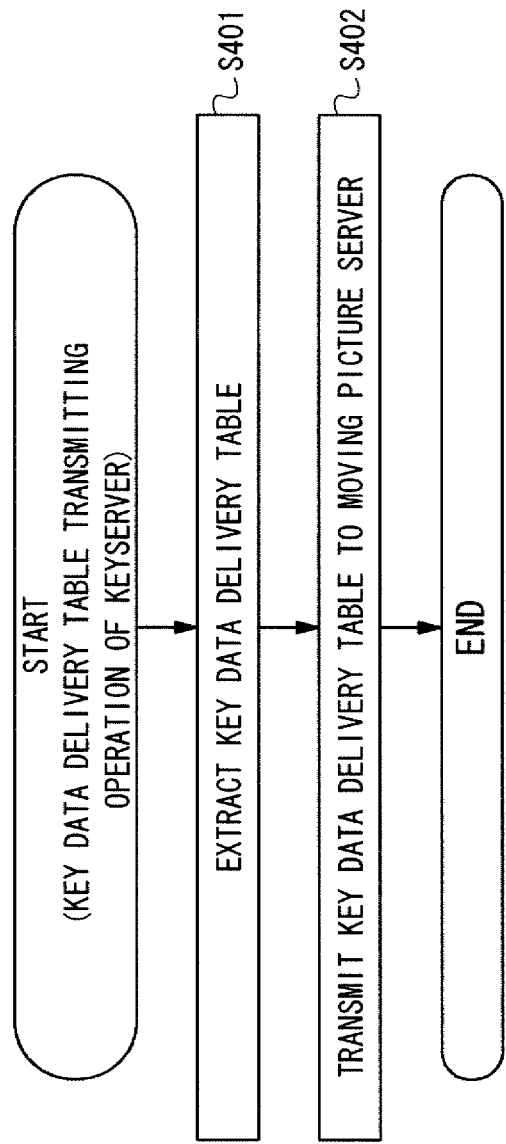
FIG. 9 is a flowchart illustrating an example of an operation flow when the keyserver device transmits a key data delivery table.

FIG. 9 is a flowchart illustrating an example of an operation flow when transmitting the key data delivery table of the keyserver device. A start of the operation flow in FIG. 9 is triggered by receiving the key data delivery table from the moving picture server device 100.

The transmitting unit 202 of the keyserver device 200, upon receiving the key data delivery table request from the moving picture server device 100, extracts from the storage unit 203 the key data delivery table T200 associated with the moving picture data (of which the identifying information is) contained in the key data delivery table request (S401). The transmitting unit 202 transmits the extracted key data delivery table T200 to the moving picture server device 100 (S402).

(Operational Effects in Embodiment)

According to the first embodiment, the moving picture server device 100 requests the keyserver device 200 for the key data delivery table T200 and is thereby enabled to recognize how many times the keyserver device 200 transmits the key data to the client device 300.

According to the first embodiment, the keyserver device 200 notifies moving picture server device 100 of the key data count of the key data transmitted to the client device 300 at the interval of the predetermined time, whereby it is feasible to recognize the key data count of the key data transmitted by the keyserver device 200 to the client device 300.

According to the first embodiment, the moving picture server device 100 can compare the number of pieces of key data (the key data delivery count) transmitted to the client device 300 from the keyserver device 200 with the number of the key data reception notifications (the key data reception notification count) transmitted from the client device 300. According to the first embodiment, the moving picture server device 100 compares the key data delivery count with the key data reception notification count and is thereby enabled to recognize whether the client device 300 etc acquires the key data in the unauthorized manner or not.

Second Embodiment

Next, a second embodiment will be discussed. The second embodiment has points common to the first embodiment.

Accordingly, the discussion will focus on different points, while the descriptions of the common points are omitted.

(Example of System Architecture)

Figure 10:
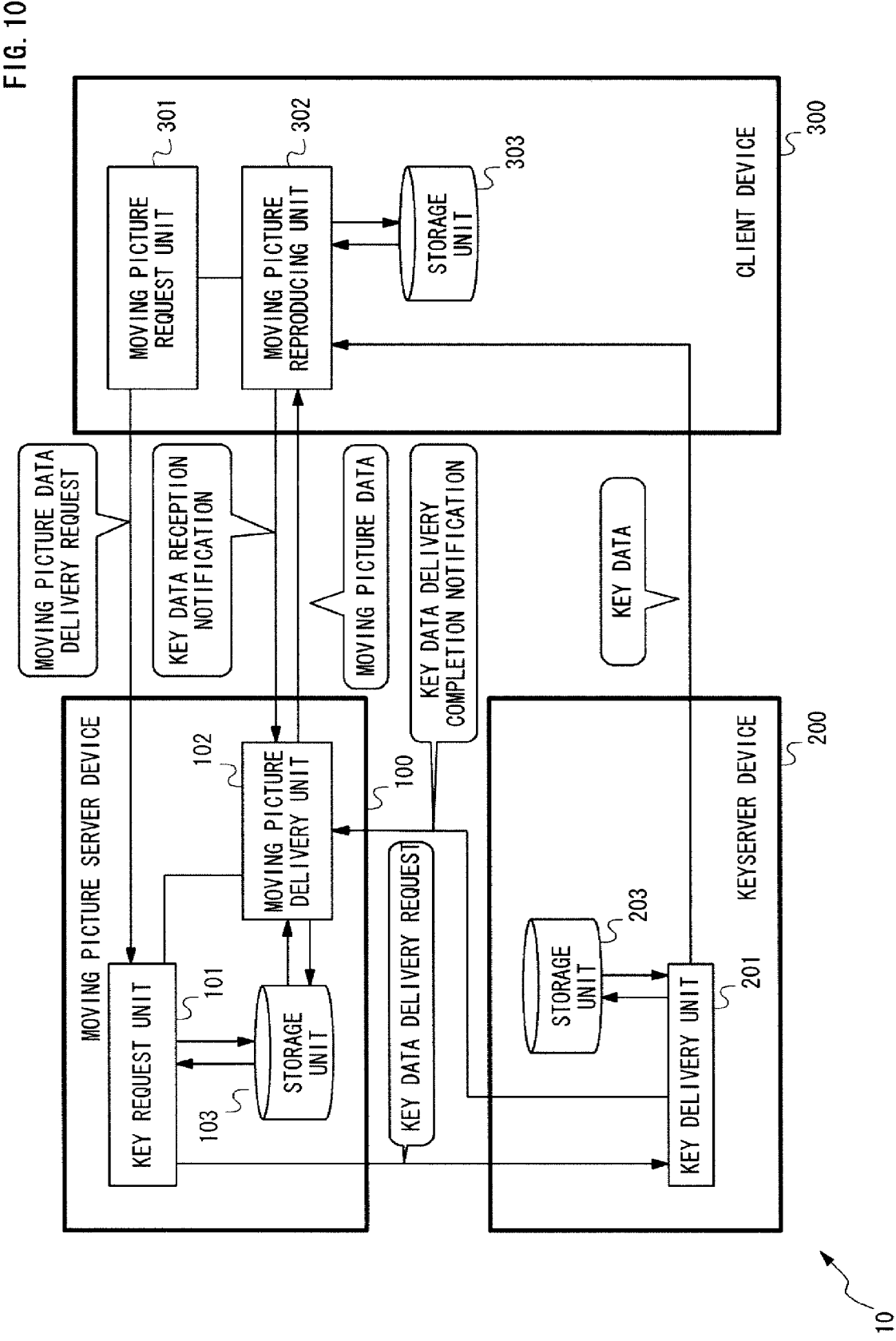
FIG. 10 is a diagram illustrating an example of an architecture of the moving picture data delivery system in a second embodiment.

FIG. 10 is a diagram illustrating an example of an architecture of the moving picture delivery system in the second embodiment. The moving picture delivery system 10 in the second embodiment includes the moving picture server device 100, the keyserver device 200 and the client device 300. In the example of FIG. 10, one single client device 300 is disclosed, however, the plurality of client devices 300 may also exist.

The keyserver device 200 includes the key delivery unit 201 and the storage unit 203.

The key delivery unit 201, when requested by the moving picture server device 100 to transmit the key data to the client device 300, transmits the key data to the client device 300. The key delivery unit 201, upon transmitting the key data to the client device 300, sends a notification indicating that the key data is transmitted to the client device 300 (which will hereinafter be referred to also as a key data delivery completion notification) to the moving picture delivery unit 102 of the moving picture server device 100.

The moving picture server device 100 includes the key request unit 101, the moving picture delivery unit 102 and the storage unit 103.

The moving picture delivery unit 102 receives the key data reception notification from the client device 300. The moving picture delivery unit 102 stores the key data reception notification count in the storage unit 103. The moving picture delivery unit 102 receives the key data delivery completion notification from the keyserver device 200. The moving picture delivery unit 102 stores the key data delivery completion notification in the storage unit 103. The moving picture delivery unit 102, if the key data reception notification count and the key data delivery completion notification that are stored in the storage unit 103 satisfy the predetermined condition, delivers the moving picture data to the client device 300 which has sent the key data reception notification. The moving picture data is the encrypted moving picture data that can be decrypted by use of the key data sent to the client device 300.

(Operational Example)

Figure 11:
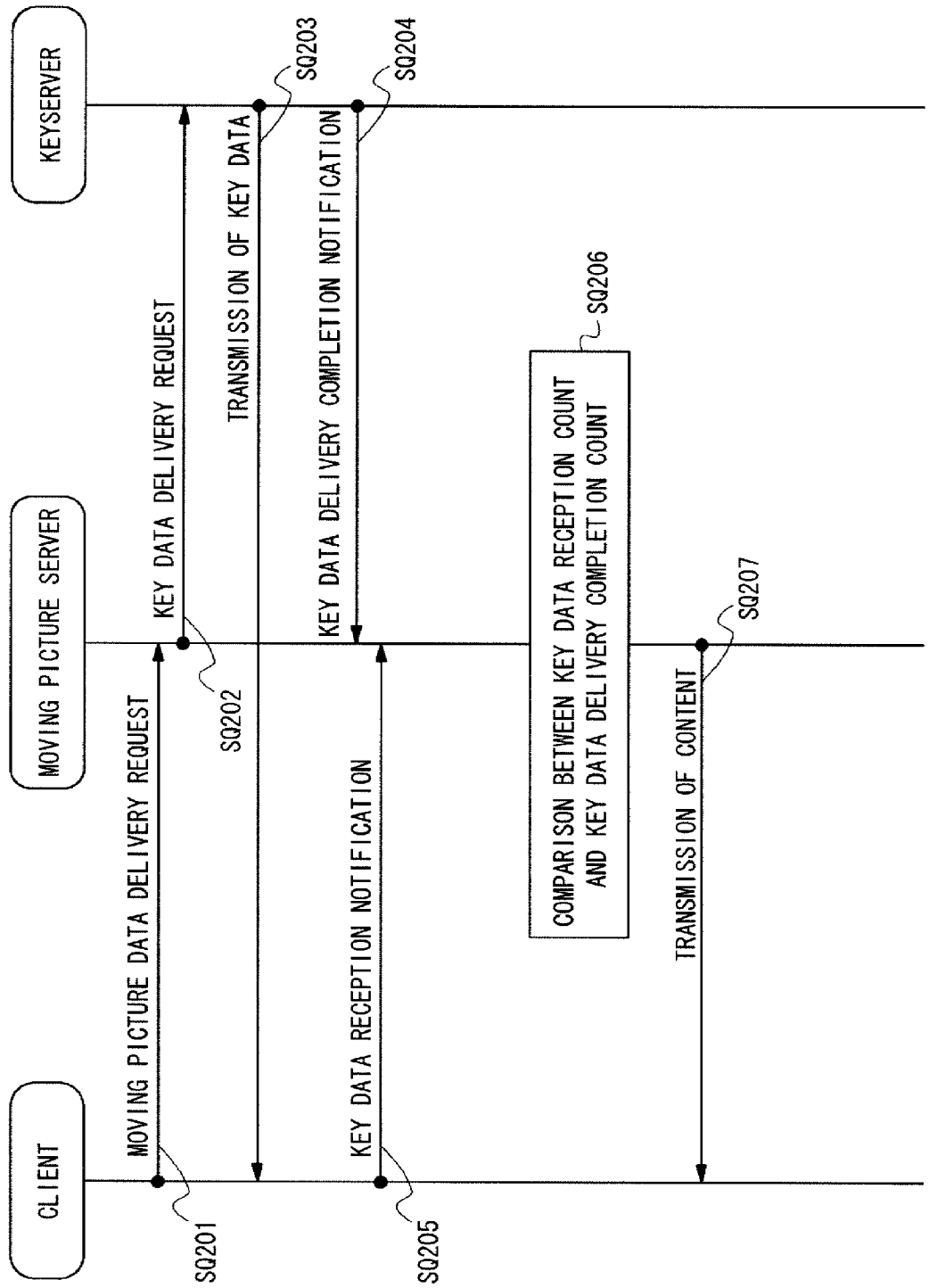
FIG. 11 is a diagram illustrating an example of an operation sequence till the client device receives the delivery of the moving picture data since the client device has made the moving picture data delivery request.

FIG. 11 is a diagram illustrating an example of an operation sequence till the client device 300 receives the delivery of the moving picture data since the client device 300 has made the moving picture data delivery request.

A sequence from SQ201 through SQ203 in FIG. 11 is the same as the sequence from SQ101 through SQ103 in FIG. 2, and hence the description thereof is omitted.

The key delivery unit 201 of the keyserver device 200, when transmitting the key data to the client device 300 (SQ203), sends to the moving picture server device 100 the key data delivery completion notification indicating that the transmission of the key data is finished (SQ204). The key data delivery completion notification contains the identifying information of the destination client device 300, the identifying information of the requested moving picture data A and the identifying information of the transmitted key data. This contrivance enables the moving picture server device 100 to recognize that the key data transmission based on the key data delivery request is completed.

The moving picture delivery unit 102 of the moving picture server device 100, upon receiving the key data delivery completion notification from the keyserver device 200, stores this notification in the storage unit 103.

The moving picture reproducing unit 302 of the client device 300, when receiving the key data from the keyserver device 200 (SQ203), sends the key data reception notification for notifying that the key data is received to the moving picture server device 100 (SQ205). The key data reception notification contains the identifying information of the client device 300 and the identifying information of the moving picture data A. The key data reception notification may further contain the identifying information of the key data.

The moving picture delivery unit 102 of the moving picture server device 100, when receiving the key data reception notification from the client device 300, stores the received key data reception notification in the storage unit 103.

The moving picture delivery unit 102 counts the number of the key data reception notifications (the key data reception notification count) associated with the moving picture data A that are stored in the storage unit 103. Further, the moving picture delivery unit 102 counts the number of the key data delivery completion notifications (which is to be termed a key data delivery completion count) associated with the moving picture data A that are stored in the storage unit 103. The moving picture delivery unit 102 compares the key data reception notification count with the key data delivery completion count (SQ206).

Similarly to the case of the first embodiment, if none of the unauthorized action is done, it never happens that the key data reception notification count exceeds the key data delivery completion count.

The moving picture delivery unit 102, if the key data reception notification count is equal to or smaller than the key data delivery completion count, transmits the moving picture data A to the client device 300 (SQ207). The moving picture data A transmitted to the client device 300 is the encrypted moving picture data that can be decrypted with the key data sent beforehand to the client device 300. The moving picture delivery unit 102 can transmit the moving picture data to the client device 300 in a way that segments the moving picture data into the plurality of segmented data. The moving picture reproducing unit 302 of the client device 300, when receiving the encrypted moving picture data, decrypts the encrypted moving picture data by use of the key data transmitted from the keyserver device 200. The moving picture reproducing unit 302 reproduces the decrypted moving picture data.

Further, the moving picture delivery unit 102 does not, if the key data reception notification count is larger than the key data delivery completion count, transmit the moving picture data A to the client device 300. This is because it is presumed that the key data associated with the moving picture data A is acquired in the unauthorized manner. Further, the moving picture delivery unit 102 stops delivering all items of data related to the moving picture data A.

<Operation Flow of Moving Picture Server>

Figure 12:
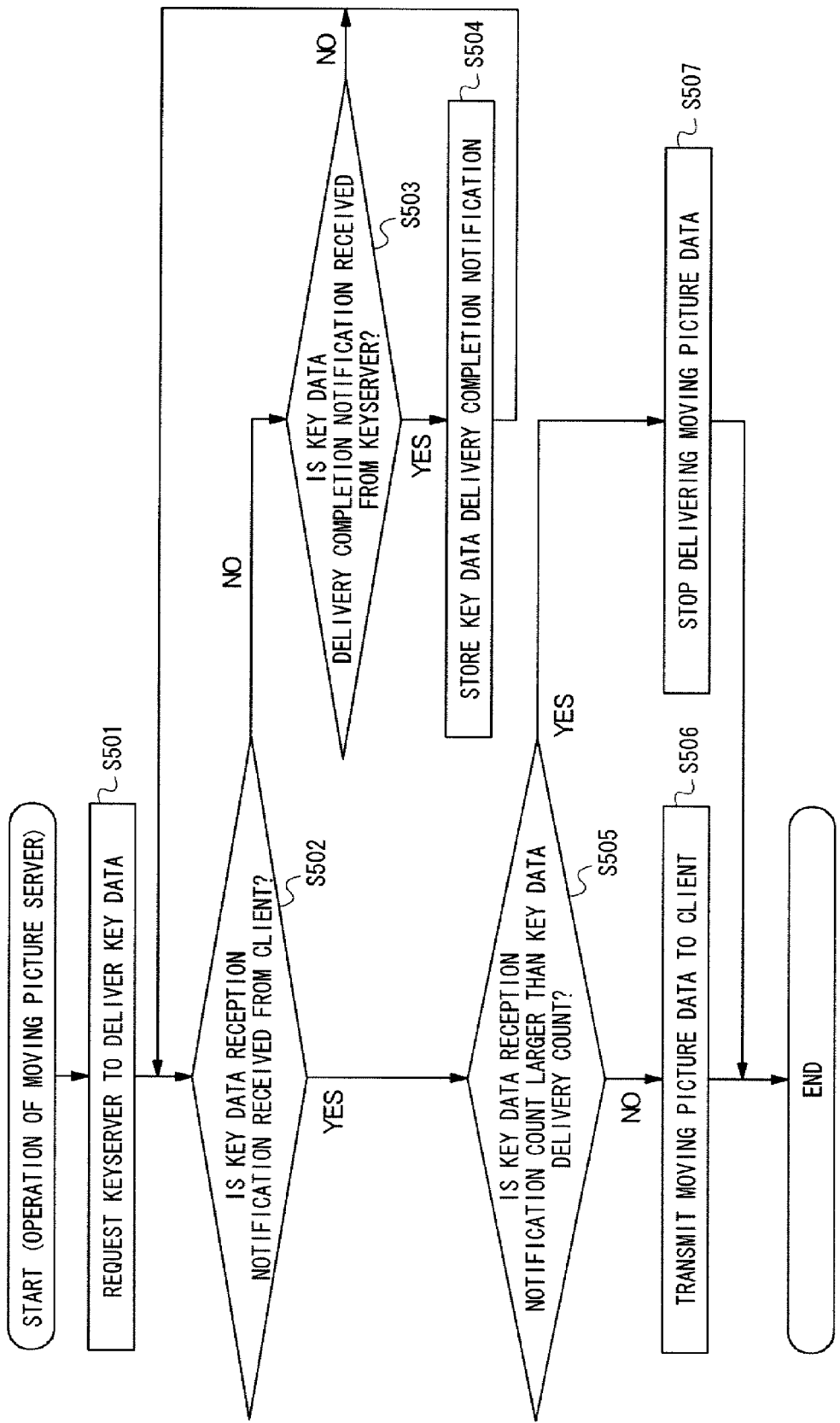
FIG. 12 is a flowchart illustrating an example of an operation flow of the moving picture server.

FIG. 12 is a flowchart illustrating an example of an operation flow of the moving picture server. A start of the operation flow in FIG. 12 is triggered by receiving the moving picture data delivery request from the client device 300.

The key request unit 101 of the moving picture server device 100, when receiving the moving picture data delivery request from the client device 300, transmits the key data delivery request to the keyserver device 200 (S501). An assumption is herein that the moving picture server device 100 receives the request for delivering the moving picture data A. The key data delivery request is a request for giving an instruction of transmitting the key data associated with the moving picture data A requested for the delivery to the client device 300. The key request unit 101 notifies the moving picture delivery unit 102 that the key data delivery request is sent to the keyserver device 200.

The moving picture delivery unit 102 of the moving picture server device 100 checks whether the key data reception notification is received from the client device 300 or not (S502). The moving picture delivery unit 102, if the key data reception notification is not yet received (S502; NO), checks whether or not the key data delivery completion notification is received from the keyserver device 200 (S503). The moving picture delivery unit 102, if the key data delivery completion notification is not received (S503; NO), returns to step S502.

The moving picture delivery unit 102, in the case of receiving the key data delivery completion notification (S503; YES), stores the received key data delivery completion notification in toe storage unit 103 (S504).

The moving picture delivery unit 102, in the case of receiving the key data from the client device 300 (S502; YES), proceeds to step S505.

The moving picture delivery unit 102 computes the key data reception notification count and the key data delivery completion count from the key data reception notifications and the key data delivery completion notifications associated with the moving picture data A, which are stored in the storage unit 103. The moving picture delivery unit 102, if the key data reception notification count is equal to or smaller than the key data delivery completion count (S505; NO), transmits the moving picture data A to the client device 300.

The moving picture delivery unit 102, whereas if the key data reception notification count is larger than the key data delivery completion count (S505; YES), does not transmit the moving picture data A to the client device 300. This is because it is presumed that the key data associated with the moving picture data A is acquired in the unauthorized manner. Further, the moving picture delivery unit 102 stops delivering all items of data related to the moving picture data A (S507).

Figure 13:
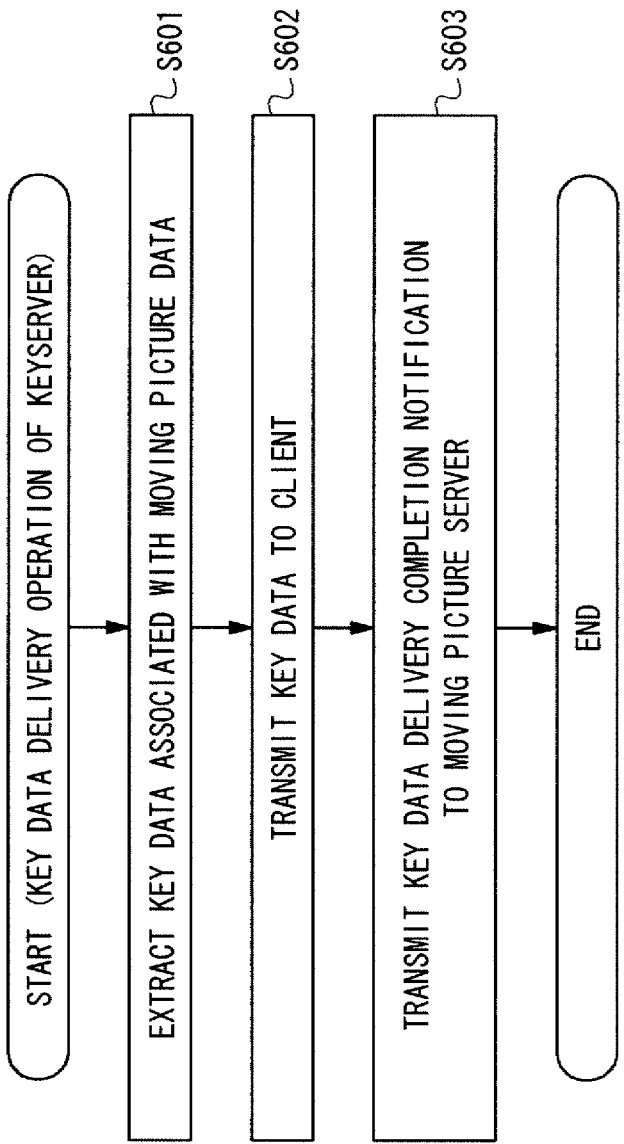
FIG. 13 is a flowchart illustrating an example of an operation flow of how the keyserver device delivers the key data.

FIG. 13 is a flowchart illustrating an example of an operation flow of how the keyserver device delivers the key data. A start of the operation flow in FIG. 13 is triggered by receiving the key data delivery request from the moving picture data server device 100.

The key delivery unit 201 of the keyserver device 200, when receiving the key data delivery request from the moving picture data server device 100, extracts the key data associated with the moving picture data from the storage unit 203 on the basis of the identifying information of the moving picture data that is contained in the key data delivery request (S601).

The key delivery unit 201 transmits the extracted key data to the client device 300 (of which the identifying information is) contained in the key data delivery request (S602). The key delivery unit 201 may, if the predetermined condition is satisfied, transmit the key data to the client device 300.

The key delivery unit 201, when sending the key data to the client device 300, transmits the key data delivery completion notification to the moving picture data server device 100 (S603). The key data delivery completion notification contains the identifying information of the recipient client device 300, the identifying information of the requested moving picture data A and the identifying information of the sent key data.

(Operational Effects in Embodiment)

According to the second embodiment, the keyserver device 200 sends the key data to the client device 300 and transmits the key data delivery completion notification to the moving picture data server device 100. According to the second embodiment, the moving picture data server device 100 can, without giving any request from the moving picture data server device 100, recognize that keyserver device 200 completes the transmission of the key data in response to the key data delivery request each time the key data is transmitted. According to the second embodiment, the moving picture data server device 100 does not, after receiving the key data reception notification, give the request to the keyserver device 200 from the moving picture data server device 100 and can therefore quickly transmit the moving picture data to the client device 300.

What is claimed is:

1. A content server device comprising:
a processor that requests a keyserver to transmit key data for decrypting encrypted content data to a client side in response to a content delivery request given from the client side,
that stores a reception count of a notification received from the client side and indicating that the key data is received from said keyserver, and a transmission count of the key data to the client side from said keyserver,
that inhibits, when the reception count is larger than the transmission count, the transmission of the encrypted content data in response to the content delivery request, and
that transmits, when the reception count is equal to or smaller than the transmission count, the encrypted content data in response to the content delivery request.

2. A content delivery method by which a computer comprising a processor makes the processor execute:
requesting, using the processor, a keyserver to transmit key data for decrypting encrypted content data to a client side in response to a content delivery request given from the client side,
storing a reception count of a notification received from the client side and indicating that the key data is received from said keyserver, and a transmission count of the key data to the client side from said keyserver,
inhibiting, when the reception count is larger than the transmission count, the transmission of the encrypted content data in response to the content delivery request, and
transmitting, when the reception count is equal to or smaller than the transmission count, the encrypted content data in response to the content delivery request.

3. A computer readable non-transitory medium storing a content delivery program to make a computer execute:
requesting a keyserver to transmit key data for decrypting encrypted content data to a client side in response to a content delivery request given from the client side; and
storing a reception count of a notification received from the client side and indicating that the key data is received from said keyserver, and a transmission count of the key data to the client side from said keyserver,
inhibiting, when the reception count is larger than the transmission count, the transmission of the encrypted content data in response to the content delivery request, and
transmitting, when the reception count is equal to or smaller than the transmission count, the encrypted content data in response to the content delivery request.

* * * * *